(12) United States Patent
Mondino et al.

(10) Patent No.: US 9,534,161 B2
(45) Date of Patent: Jan. 3, 2017

(54) REFRIGERANT MIXTURES

(71) Applicant: TAZZETTI S.p.A., Volpiano (IT)

(72) Inventors: Riccardo Mondino, La Loggia (IT); Valentina Longoni, S. Maurizio Canavese (IT)

(73) Assignee: TAZZETTI S.P.A., Volpiano (Turin) (IT)

( * ) Notice: Subject to any disclaimer, the term of this patent is extended or adjusted under 35 U.S.C. 154(b) by 0 days.

(21) Appl. No.: 14/414,457

(22) PCT Filed: Jul. 16, 2013

(86) PCT No.: PCT/IB2013/055832
§ 371 (c)(1),
(2) Date: Jan. 13, 2015

(87) PCT Pub. No.: WO2014/013426
PCT Pub. Date: Jan. 23, 2014

(65) Prior Publication Data
US 2015/0166864 A1 Jun. 18, 2015

(30) Foreign Application Priority Data
Jul. 16, 2012 (IT) .............................. TO2012A0625

(51) Int. Cl.
C09K 5/04 (2006.01)
F25B 45/00 (2006.01)
(52) U.S. Cl.
CPC ............... *C09K 5/042* (2013.01); *F25B 45/00* (2013.01); *C09K 2205/12* (2013.01); *C09K 2205/40* (2013.01); *F25B 2345/001* (2013.01)
(58) Field of Classification Search
CPC ............................ C09K 5/042; C09K 2205/12
See application file for complete search history.

(56) References Cited

U.S. PATENT DOCUMENTS

2008/0245992 A1 10/2008 Ochoa Vivanco
2010/0320413 A1 12/2010 Maruya

FOREIGN PATENT DOCUMENTS

CN 1693408 A 11/2005
CN 101402847 A 4/2009

OTHER PUBLICATIONS

H.W. Scheeline et al., "Vapor-Liquid Equilibrium in the System Propane-Isobutylene", Industrial & Engineering Chemistry 1939, vol. 31, No. 8, Aug. 1939, pp. 1050-1057.*

(Continued)

*Primary Examiner* — John Hardee
(74) *Attorney, Agent, or Firm* — Thomas Horstemeyer, LLP

(57) ABSTRACT

A method of providing a replacement or alternative refrigerant, wherein the replacement or alternative refrigerant is a gaseous mixture consisting of propane in a concentration from 71% to 79% by weight and butene in a concentration from 21% to 29% by weight as a replacement or alternative refrigerant gas for R134a and/or for other refrigerants which are replacements or alternatives to R134a containing HFC (hydrofluorocarbons), HFO (hydrofluoro olefins) and HFE (hydrofluoro ethers).

4 Claims, 2 Drawing Sheets

Propane/Isobutene (75/25): P/T Curve

(56) References Cited

OTHER PUBLICATIONS

Shin, J.Y. et al.; Experimental Study on Forced Convective Boiling Heat Transfer of Pure Refrigerants and Refrigerant Mixtures in a Horizontal Tube; International Journal of Refrigeration, Editions Elsevier (Paris, FR); vol. 20, No. 4; Jun. 1, 1997, pp. 267-275.
Chang Y.S. et al.; "Performance and Heat Transfer Characteristics of Hydrocarbon Refrigerants in a Heat Pump System"; International Journal of Refrigeration, Editions Elsevier (Paris, FR); vol. 23, No. 3; May 1, 2000, pp. 232-242.
Granryd E.; "Hydrocarbons as Refrigerants—an Overview"; International Journal of Refrigeration, Editions Elsevier (Paris, FR); vol. 24, No. 1; Jan. 1, 2001, pp. 15-24.
Sun et al.; "Nucleate Pool Boiling Heat Transfer Coefficients of Pure HFC134a, HC290, HC600a and their Binary and Ternary Mixtures"; International Journal of Heat and Mass Transfer; Pergamon Press (GB); vol. 50, No. 1-2; Nov. 11, 2006, pp. 94-104.
Mani K. et al.; "Experimental Analysis of a New Refrigerant Mixture as Drop-in Replacement for CFC12 and HFC134a"; International Journal of Thermal Sciences, Editions Elsevier, (Paris, FR); vol. 47, No. 11; Nov. 1, 2008; pp. 1490-1495.
Dalkilic A.S. et al.; "A performance comparison of vapour-compression refrigeration system using various alternative refrigerants"; International Communications in Heat and Mass Transfer, Pergamon Publishers (New York, US); vol. 37, No. 9, Nov. 1, 2010, pp. 1340-1349.
Jung D. et al.; "Testing of Propane/isobutane Mixture in Domestic Refrigerators"; International Journal of Refrigeration, Editions Elsevier (Paris, FR); vol. 23, No. 7; Nov. 1, 2000, pp. 517-527.
Wongwises S. et al.; "Experimental Study of Hydrocarbon Mixtures to Replace HFC-134a in a Domestic Refrigerator"; Energy Conversion and Management, Elsevier Science Publishers (Oxford, GB); vol. 46, No. 1; Jan. 1, 2005, pp. 85-100, May 16, 2016.

\* cited by examiner

REFRIGERANT MIXTURES

CROSS-REFERENCE TO RELATED APPLICATION

This application is the 35 U.S.C. §371 national stage of PCT Application No. PCT/IB2013/055832, filed Jul. 16, 2013, which is herein incorporated by reference in its entirety and which also claims priority to, and the benefit of, Italian Patent Application TO2012A000625, filed Jul. 16, 2012, which is herein incorporated by reference in its entirety.

The present invention relates to gaseous mixtures that are useful as replacement or alternative refrigerants for R134a.

R134a (1, 1, 1, 2-tetrafluoroethane) is a hydrofluorocarbon which has been used since the start of the 1990s as a replacement refrigerant gas for chlorofluorocarbons or hydrochlorofluorocarbons, which have a substantial ozone depletion potential (ODP hereinbelow) and which are regulated by the Montreal protocol.

Unlike chlorofluorocarbons or hydrochlorofluorocarbons, R134a does not have a substantial ODP and has found and finds application particularly as a refrigerant for air conditioning or refrigeration.

However, R134a has a high global warming potential (GWP hereinbelow), and, following the Kyoto protocol, the European regulation has limited and will gradually limit its availability and use in air-conditioning or refrigeration plants.

The main aim of the present invention is to provide refrigerant gas mixtures that may be used as replacements or alternatives to R134a, and/or other replacement or alternative refrigerants for R134a containing HFC (hydrofluorocarbons), HFO (hydrofluoro olefins) and HFE (hydrofluoro ethers), which have a lower production cost and improved environmental impact characteristics, particularly in terms of the GWP, relative to those of R134a, together with thermodynamic properties that are suitable for their use as replacement refrigerant gases with improved characteristics in applications as air conditioning for motor vehicles, and domestic, commercial and industrial air conditioning and refrigeration.

The invention is based on the acknowledgement that the above mentioned aims may be achieved by using a gaseous mixture of non-fluorinated hydrocarbons with relative concentrations of the constituent hydrocarbons of the mixture that are within a quite limited range.

Binary mixtures of hydrocarbons have already been proposed in the prior art as refrigerant gases; for example, U.S. Pat. No. 1,497,615 refers to a refrigerant mixture of isobutane and of another hydrocarbon compound of lower molecular weight, with a boiling point above 45° C.

CN 101402847 describes mixtures consisting of isobutane and propane as components of a refrigerant mixture which is a replacement for R22, in which propane may be present in a concentration from 80% to 89% by weight and isobutane in a concentration from 11% to 20% by weight.

CN 1693408 describes mixtures comprising propane in an amount from 55% to 62% by weight and isobutane in an amount from 38% to 45% by weight as replacement refrigerants for R134a.

The documents Shin J. Y. et al., International Journal of Refrigeration, Vol. 20, No. 4, 1 Jun. 1997, pages 267-275, Chang Y. S. et al, International Journal of Refrigeration, Vol. 23, No. 3, 1 May 2000, pages 232-242 and Granryd E., International Journal of Refrigeration, Vol. 24, No. 1, 1 Jan. 2001, pages 15-24 describe refrigerant mixtures consisting of propane/isobutane in a 75/25 weight ratio.

In this respect, the present invention provides mixtures which, by virtue of a specific selection of the concentration ranges of the hydrocarbons used, make it possible to obtain thermodynamic characteristics that are particularly suitable and improved for replacing R134a.

A subject of the invention is thus the use of a gaseous mixture selected from the group consisting of:
propane in a concentration from 71% to 79% by weight and a gas selected from the group consisting of isobutene and butene or mixtures thereof in a concentration from 21% to 29% by weight as a replacement or alternative refrigerant gas for R134a, in air-conditioning or refrigeration plants, particularly in motor vehicle air conditioning designed for the use of R134a.

In the present description, the examples and the claims, the term "butene" includes 1-butene and cis and trans 2-butene.

The mixtures according to the invention find use both in brand new installations and in the retrofit of existing installations, requiring only the replacement of certain components since the mixtures according to the invention are flammable.

In particular, the mixtures according to the invention find application in air-conditioning systems of motor vehicles, refrigerated cabinet for supermarkets, cold stores, domestic refrigerators, centrifugal chillers, domestic, commercial and industrial air-conditioning plants, domestic, commercial and industrial chillers, air-conditioning or refrigeration plants in the process industry, refrigerated transport, chilled water dispensers, commercial ice machines, and domestic, commercial and industrial dehumidifiers.

Air-conditioning or refrigeration plants which use the mixtures according to the invention as refrigerant also fall within the scope of the invention.

Another subject of the invention is refrigerant mixtures consisting of 71% to 79% by weight of propane and 21% to 29% by weight of isobutene, butene or mixtures thereof.

Within the scope of the restricted concentration range of the constituent gases of the mixtures, preferred mixtures are those selected from the group consisting of:
74-79% by weight and particularly 75% by weight of propane and 21-26% by weight and particularly 25% by weight of a gas selected from the group consisting of isobutene or butene.

The mixtures proposed herein have improved characteristics relative to the use of R134a in refrigeration cycles for moderate and high temperature applications.

The table which follows illustrates a number of salient characteristics relating to the thermodynamic properties of the mixtures according to the invention within the scope of the concentration ranges mentioned above, together with the salient environmental impact characteristics thereof, such as the ODP and the GWP, compared with the corresponding properties of R134a.

TABLE 1

|  | Boiling point ° C. | Glide ° C. | ODP | GWP |
| --- | --- | --- | --- | --- |
| Propane/Isobutene | −37.6-39.0 | 8.4-6.5 | 0 | 3 |
| Propane/Butene | −37.9-39.2 | 8.3-6.3 | 0 | 2.7-2.8 |
| R134a | −26.3 | — | 0 | 1300 |

As it is seen from the table given above, the mixtures used according to the invention have low glide values (difference between the boiling point and the dew point at a pressure of 1 atmosphere).

In comparison with R134a, the mixtures drastically reduce the GWP from 1300 to values generally not exceeding 3.

In addition, since the mixtures consist exclusively of hydrocarbons, they make it possible to have wide availability of low-cost raw materials.

Figure 1:
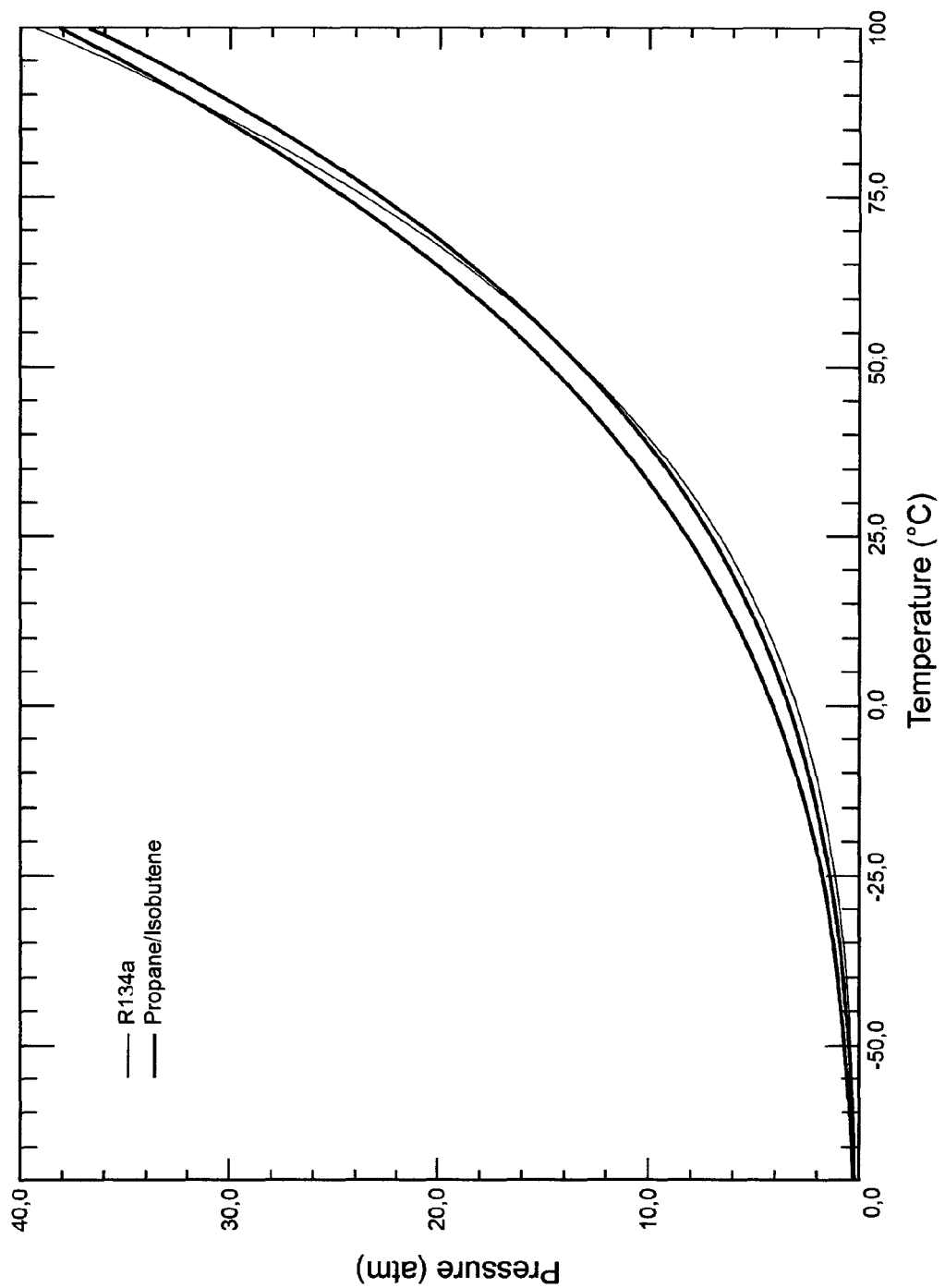
FIGS. 1 and 2 are diagrams illustrating the pressure and temperature curves for the preferred mixtures according to the invention compared with the corresponding curves relating to R134a; the relevant numerical values are given in Tables 3 and 4.
Figure 2:
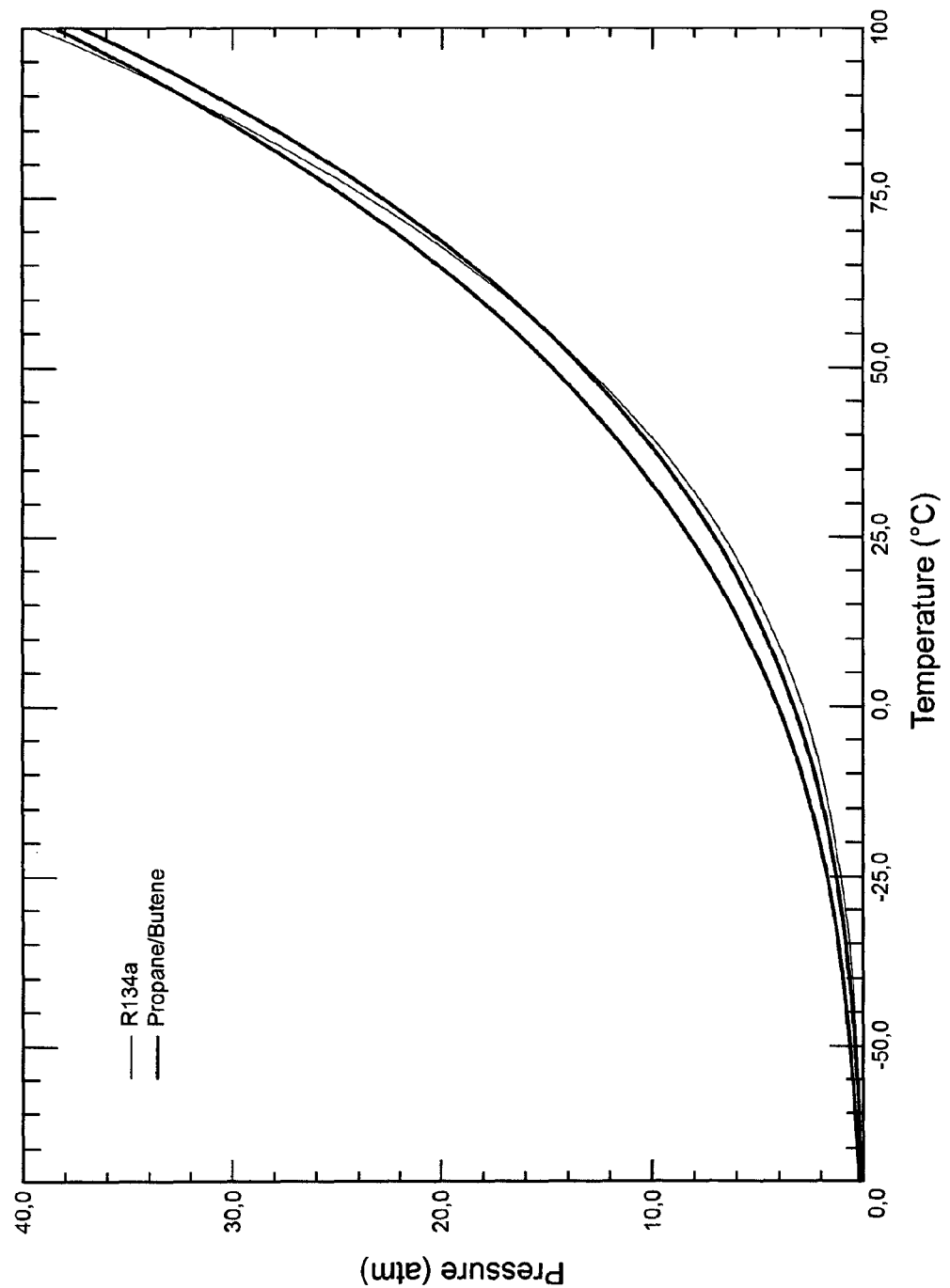

A comparative table between R134a and the replacements that are the subject of the present invention is presented hereinbelow.

TABLE 2

| % | Refrigerant | COPh | COPc |
|---|---|---|---|
| pure | R134a | 3.727 | 2.796 |
| 75/25 | Propane/Isobutene | 3.691 | 2.760 |
| 75/25 | Propane/Butene | 3.700 | 2.769 |

The table describes the coefficients of performance (COP) for specific mixtures that are the subject of the invention, compared with R134a.

The coefficients of performance in heating (COPh) and in cooling (COPc) are indicated in the table.

The values were calculated for an air-conditioning plant with a thermal capacity of 6 KW in cooling, 500 W of auxiliary power and subcooling by 5° C. The excess heat was considered as additional heat to the condenser.

The indicated values are the results of a mathematical simulation based on thermodynamic data known from the literature, exploiting internationally recognized programs.

It may be observed that, in all cases, the COP of the proposed mixtures is entirely in line with that of R134a.

TABLE 3

Propane/Isobutene (75/25): P/T Table

| T ° C. | P R134a atm | $P^L$ mix atm | $P^V$ mix atm |
|---|---|---|---|
| −70 | 0.08 | 0.20 | 0.12 |
| −65 | 0.11 | 0.27 | 0.16 |
| −60 | 0.16 | 0.35 | 0.22 |
| −55 | 0.22 | 0.46 | 0.30 |
| −50 | 0.29 | 0.59 | 0.39 |
| −45 | 0.39 | 0.74 | 0.51 |
| −40 | 0.51 | 0.93 | 0.65 |
| −35 | 0.65 | 1.15 | 0.83 |
| −30 | 0.83 | 1.41 | 1.04 |
| −25 | 1.05 | 1.71 | 1.28 |
| −20 | 1.31 | 2.06 | 1.57 |
| −15 | 1.62 | 2.46 | 1.91 |
| −10 | 1.98 | 2.92 | 2.30 |
| −5 | 2.40 | 3.44 | 2.75 |
| 0 | 2.89 | 4.02 | 3.27 |
| 5 | 3.45 | 4.68 | 3.85 |
| 10 | 4.09 | 5.41 | 4.50 |
| 15 | 4.82 | 6.22 | 5.24 |
| 20 | 5.64 | 7.12 | 6.06 |
| 25 | 6.57 | 8.11 | 6.97 |
| 30 | 7.60 | 9.20 | 7.98 |
| 35 | 8.75 | 10.39 | 9.09 |
| 40 | 10.03 | 11.69 | 10.32 |
| 45 | 11.45 | 13.10 | 11.66 |
| 50 | 13.01 | 14.63 | 13.12 |
| 55 | 14.72 | 16.29 | 14.72 |
| 60 | 16.60 | 18.08 | 16.45 |
| 65 | 18.65 | 20.01 | 18.34 |
| 70 | 20.89 | 22.09 | 20.38 |
| 75 | 23.33 | 24.32 | 22.59 |
| 80 | 25.99 | 26.71 | 24.98 |
| 85 | 28.88 | 29.26 | 27.56 |
| 90 | 32.02 | 32.00 | 30.35 |
| 95 | 35.44 | 34.92 | 33.38 |
| 100 | 39.20 | 38.02 | 36.68 |

TABLE 4

Propane/Butene (75/25): P/T Table

| T ° C. | P R134a atm | $P^L$ mix atm | $P^V$ mix atm |
|---|---|---|---|
| −70 | 0.08 | 0.20 | 0.12 |
| −65 | 0.11 | 0.27 | 0.16 |
| −60 | 0.16 | 0.36 | 0.22 |
| −55 | 0.22 | 0.46 | 0.30 |
| −50 | 0.29 | 0.59 | 0.40 |
| −45 | 0.39 | 0.75 | 0.52 |
| −40 | 0.51 | 0.94 | 0.66 |
| −35 | 0.65 | 1.16 | 0.84 |
| −30 | 0.83 | 1.42 | 1.05 |
| −25 | 1.05 | 1.73 | 1.30 |
| −20 | 1.31 | 2.08 | 1.60 |
| −15 | 1.62 | 2.48 | 1.94 |
| −10 | 1.98 | 2.94 | 2.34 |
| −5 | 2.40 | 3.46 | 2.80 |
| 0 | 2.89 | 4.05 | 3.32 |
| 5 | 3.45 | 4.71 | 3.90 |
| 10 | 4.09 | 5.45 | 4.57 |
| 15 | 4.82 | 6.26 | 5.31 |
| 20 | 5.64 | 7.17 | 6.14 |
| 25 | 6.57 | 8.17 | 7.06 |
| 30 | 7.60 | 9.26 | 8.08 |
| 35 | 8.75 | 10.46 | 9.21 |
| 40 | 10.03 | 11.77 | 10.44 |
| 45 | 11.45 | 13.19 | 11.80 |
| 50 | 13.01 | 14.73 | 13.27 |
| 55 | 14.72 | 16.40 | 14.89 |
| 60 | 16.60 | 18.21 | 16.64 |
| 65 | 18.65 | 20.15 | 18.54 |
| 70 | 20.89 | 22.24 | 20.60 |
| 75 | 23.33 | 24.48 | 22.82 |
| 80 | 25.99 | 26.89 | 25.23 |
| 85 | 28.88 | 29.46 | 27.84 |
| 90 | 32.02 | 32.22 | 30.65 |
| 95 | 35.44 | 35.16 | 33.71 |
| 100 | 39.20 | 38.30 | 37.05 |

The invention claimed is:
1. A method comprising:
providing a replacement or alternative refrigerant, wherein the replacement or alternative refrigerant is a gaseous mixture consisting of:
propane in a concentration from 71% to 79% by weight and butene or mixtures thereof in a concentration from 21% to 29% by weight as a replacement or alternative refrigerant gas for R134a and/or for other refrigerants which are replacements or alternatives to R134a containing HFC (hydrofluorocarbons), HFO (hydrofluoro olefins) and HFE (hydrofluoro ethers).

2. The method of claim 1, wherein the gaseous mixture consists of 75% by weight of propane and 25% by weight of butene.

3. The method of claim 1, wherein said gaseous mixture is used in air-conditioning or refrigeration plants.

4. The method of claim 1, wherein said gaseous mixture is used in air-conditioning systems of motor vehicles, refrigerated cabinets for supermarkets, cold stores, domestic refrigerators, centrifugal chillers, domestic, commercial and industrial air-conditioning plants, domestic, commercial and industrial chillers, air-conditioning or refrigeration plants in the process industry, refrigerated transport, chilled water dispensers, commercial ice machines, and domestic, commercial and industrial dehumidifiers.

* * * * *